(12) United States Patent
Yeh et al.

(10) Patent No.: US 10,699,084 B2
(45) Date of Patent: Jun. 30, 2020

(54) LOCAL INTERACTION SYSTEMS AND METHODS

(71) Applicant: Universal City Studios LLC, Universal City, CA (US)

(72) Inventors: Wei Cheng Yeh, Orlando, FL (US); Travis Jon Cossairt, Celebration, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/882,788

(22) Filed: Jan. 29, 2018

(65) Prior Publication Data

US 2019/0220636 A1 Jul. 18, 2019

Related U.S. Application Data

(60) Provisional application No. 62/617,508, filed on Jan. 15, 2018.

(51) Int. Cl.
*G06K 7/10* (2006.01)
*A63G 33/00* (2006.01)
*A63G 31/00* (2006.01)
*G06F 12/0802* (2016.01)

(52) U.S. Cl.
CPC ......... *G06K 7/10366* (2013.01); *A63G 31/00* (2013.01); *A63G 33/00* (2013.01); *G06F 12/0802* (2013.01); *G06F 2212/251* (2013.01)

(58) Field of Classification Search
CPC ............ G06K 7/10366; G06F 12/0802; G06F 2212/251
See application file for complete search history.

(56) References Cited

U.S. PATENT DOCUMENTS

| 5,946,444 A | 8/1999 | Evans et al. |
| 6,142,368 A | 11/2000 | Mullins et al. |
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |

(Continued)

FOREIGN PATENT DOCUMENTS

| JP | 2003288472 A | 10/2003 |
| JP | 2004126791 A | 4/2004 |
| JP | 2005267179 A | 9/2005 |
| JP | 2010000178 A | 1/2010 |
| JP | 2012244846 A | 12/2012 |
| JP | 2013188019 A | 9/2013 |
| JP | 6152919 B1 | 6/2017 |
| WO | 0146916 | 6/2001 |

OTHER PUBLICATIONS

PCT/US2018/060826 Invitation to Pay Additional Fees dated Feb. 28, 2019.

(Continued)

*Primary Examiner* — Sonji N Johnson
(74) *Attorney, Agent, or Firm* — Fletcher Yoder, P.C.

(57) ABSTRACT

An interaction point includes a hardware-based processor, a local cache data store that stores attraction data pertaining to an entertainment attraction, and a radio-frequency identification (RFID) reader that receives electromagnetic radiation of a wearable electronic device indicative of an interaction with the interaction point. The hardware-based processor, based upon the interaction with the interaction point: causes feedback to be rendered by the wearable electronic device, causes modification to at least a portion of the attraction data, or both.

20 Claims, 7 Drawing Sheets

(56) References Cited

U.S. PATENT DOCUMENTS

| | | |
|---|---|---|
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,186,585 B2 | 11/2015 | Briggs et al. |
| 9,196,964 B2 | 11/2015 | Baringer |
| 9,207,650 B2 | 12/2015 | Narendra et al. |

(56) References Cited

U.S. PATENT DOCUMENTS

| | | | |
|---|---|---|---|
| 9,215,592 B2 | 12/2015 | Narendra et al. |
| 9,225,372 B2 | 12/2015 | Butler |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,909,896 B2 | 3/2018 | Bass et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,949,219 B2 | 4/2018 | Belogolovy |
| 9,972,894 B2 | 5/2018 | Dion et al. |
| 9,993,724 B2 | 6/2018 | Barney et al. |
| 1,001,079 A1 | 7/2018 | Weston et al. |
| 1,002,262 A1 | 7/2018 | Barney et al. |
| 2010/0308964 A1* | 12/2010 | Ackley ............... H04B 5/0031 340/10.1 |
| 2012/0286938 A1 | 11/2012 | Cote et al. |
| 2013/0324059 A1 | 12/2013 | Lee et al. |
| 2014/0122170 A1 | 5/2014 | Padgett et al. |
| 2014/0162693 A1 | 6/2014 | Wachter et al. |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0194817 A1 | 7/2015 | Lee et al. |
| 2015/0236551 A1 | 8/2015 | Shearer et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0067600 A1 | 3/2016 | Barney et al. |
| 2016/0144280 A1 | 5/2016 | Pawlowski et al. |
| 2016/0170998 A1 | 6/2016 | Frank et al. |
| 2016/0182165 A1 | 6/2016 | Margon et al. |
| 2016/0184698 A1* | 6/2016 | Tan ............... A63F 13/216 463/2 |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0307398 A1 | 10/2016 | Walker et al. |
| 2016/0321548 A1 | 11/2016 | Ziskind et al. |
| 2016/0373522 A1 | 12/2016 | Carlos et al. |
| 2017/0091850 A1 | 3/2017 | Alvarez et al. |
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270734 A1* | 9/2017 | Geraghty ............... G07C 11/00 |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0008897 A1 | 1/2018 | Ackley et al. |
| 2018/0014385 A1 | 1/2018 | Wein |
| 2018/0078853 A1 | 3/2018 | Barney et al. |
| 2018/0214769 A1 | 8/2018 | Briggs et al. |
| 2018/0318723 A1 | 11/2018 | Weston |
| 2018/0339226 A1 | 11/2018 | Barney et al. |

OTHER PUBLICATIONS

U.S. Appl. No. 15/882,761, filed Jan. 29, 2018, Wei Cheng Yeh.
U.S. Appl. No. 15/882,721, filed Jan. 29, 2018, Wei Cheng Yeh.
U.S. Appl. No. 15/882,738, filed Jan. 29, 2018, Travis Jon Cossairt.
U.S. Appl. No. 15/972,940, filed May 7, 2018, Unavailable.
U.S. Appl. No. 15/995,633, filed Jun. 1, 2018, Unavailable.
U.S. Appl. No. 16/196,967, filed Nov. 20, 2018, Matthew Usi.
U.S. Appl. No. 15/826,357, filed Nov. 29, 2017, Wei Yeh.
U.S. Appl. No. 15/833,839, filed Dec. 6, 2017, Travis Jon Cossairt.
U.S. Appl. No. 15/861,502, filed Jan. 3, 2018, Wei Cheng Yeh.
U.S. Appl. No. 15/874,671, filed Jan. 18, 2018, Wei Cheng Yeh.

* cited by examiner

LOCAL INTERACTION SYSTEMS AND METHODS

CROSS-REFERENCE TO RELATED APPLICATION

This application claims priority from and the benefit of U.S. Provisional Application No. 62/617,508, entitled "LOCAL INTERACTION SYSTEMS AND METHODS," filed Jan. 15, 2018, which is hereby incorporated by reference in its entirety for all purposes.

FIELD OF DISCLOSURE

The present disclosure relates generally to interactive systems and methods. More specifically, embodiments of the present disclosure relate to interactive systems and methods that utilize a wearable device to provide feedback to a guest in an amusement park.

BACKGROUND

Amusement parks and/or theme parks may include various entertainment attractions. Some existing attractions may provide guests with an immersive or interactive experience. For example, guests may visit areas having various features, such as audio, video, and special effects. With the increasing sophistication and complexity of modern attractions, and the corresponding increase in expectations among amusement park and/or theme park guests, improved and more creative attractions are needed, including attractions that provide a more interactive and personalized experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, an interaction point includes a hardware-based processor, a local cache data store that stores attraction data pertaining to an entertainment attraction, and a radio-frequency identification (RFID) reader that receives electromagnetic radiation of a wearable electronic device indicative of an interaction with the interaction point. The hardware-based processor, based upon the interaction with the interaction point: causes feedback to be rendered by the wearable electronic device, causes modification to at least a portion of the attraction data, or both.

In one embodiment, an interactivity system for an entertainment attraction, includes first and second interaction points. Each of the interaction points includes a hardware-based processor, a local cache data store that stores a copy of attraction data pertaining to an entertainment attraction local to the interaction point, and a radio-frequency identification (RFID) reader that retrieves electromagnetic radiation of a wearable electronic device indicative of an interaction with the interaction point. The hardware-based processor, based upon the interaction with the interaction point, modifies at least a portion of the local copy of the attraction data.

In one embodiment, a wearable device includes a radio-frequency transmitter configured to transmit electro-magnetic radiation to an interactive point configured to process the electromagnetic radiation using data stored in a local data cache. The electromagnetic radiation is indicative of an interaction with an interactive point. The wearable device includes one or more output devices that provide feedback based upon data received from the interactive point.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
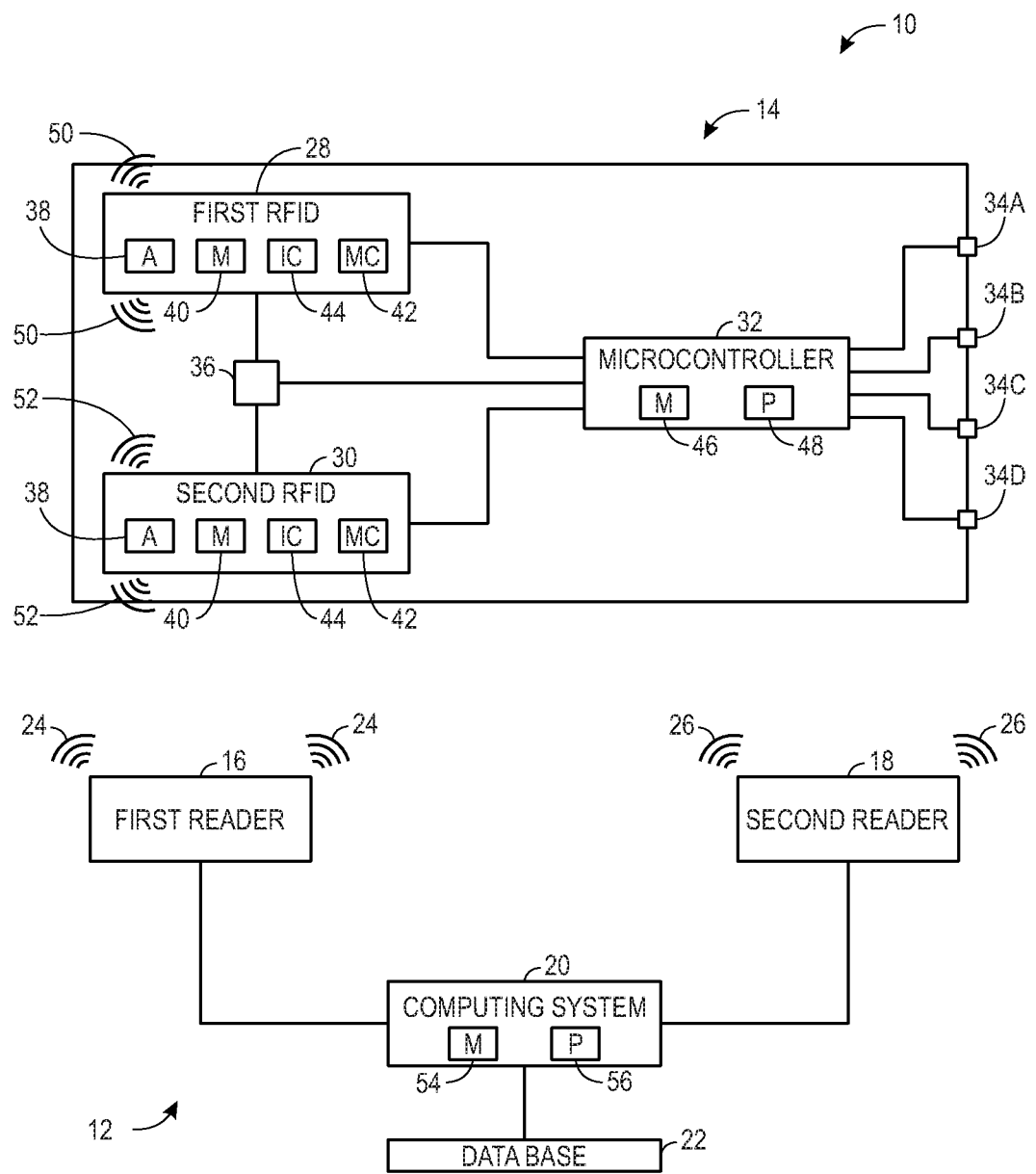
FIG. 1 is a schematic diagram of an interactive system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. The different types of entertainment may include features that enhance a guest's experience at the amusement park. For example, a game may detect a guest's interaction with rendered images that are shown on a display screen. However, some interactive systems may provide a suboptimal experience due to a lack of feedback to notify the guest that an interaction is successful (e.g., recognized by the interactive system). Furthermore, some interactive systems may not determine an identity of the guest that interacted with the interactive element, and thus, may not accurately or efficiently track points or other game statistics for each guest. Thus, it may be desirable to provide systems and methods that provide feedback to the guest to indicate to the guest that the interactions are actually detected by the interactive system and/or that track game statistics for each guest.

Accordingly, the present disclosure relates to systems and methods that utilize radio-frequency identification (RFID) to provide feedback to a guest based on the guest's interactions with an interactive system. More particularly, the present disclosure relates to an interactive system that includes one or more RFID readers and multiple wearable devices each having one or more RFID tags and one or more feedback devices (e.g., lights) that cooperate to indicate a successful interaction with an interactive element of an attraction. The components of the interactive system disclosed herein may also facilitate tracking of the guest's interactions and progress (e.g., game statistics) as the guest travels through the attraction.

As used below, the term "user" may refer to a user of the interactive system, and the user may be a guest at an amusement park. By way of example, a user may wear or carry the wearable device having the one or more feedback devices as the user travels through an attraction. The attraction may have various interactive elements, which may be any of a variety of images or objects (e.g., rendered images, virtual elements, or graphical elements presented on a display screen; physical targets; costumed characters). To experience the attraction, the user may interact with the interactive elements, such as by touching a physical target or approaching a costumed character, for example.

One or more RFID readers of the interactive system may be positioned at various locations about the attraction and/or proximate to certain interactive elements. In operation, the one or more RFID readers communicate with the one or more RFID tags within the wearable device of the user. The communication between the one or more RFID readers and the one or more RFID tags may trigger a feedback response via the one or more feedback devices (e.g., illuminate a light) of the wearable device, thereby providing feedback to notify the user that the interactive system has detected the user within the attraction and/or has detected the user's interaction with an interactive element, for example. The communication between the one or more RFID readers and the one or more RFID tags may also enable the interactive system to track the user's progress (e.g., game statistics) as the user travels through the attraction. For example, the interactive system may detect and keep track of the number of targets contacted by the user and/or the number of costumed characters met by the user.

Furthermore, in one embodiment, the interactive system may provide feedback indicative of the user's status (e.g., level within the game) via the one or more feedback devices of the wearable device. For example, upon reaching a certain number of points or an advanced level in the game, the one or more RFID readers may write data to the one or more RFID tags within the wearable device that trigger a feedback response via the one or more feedback devices (e.g., illuminate multiple lights). Thus, the interactive system may provide substantially immediate feedback when the user interacts with interactive elements of the attraction and/or when the user reaches certain levels (e.g., milestones or achievements). Furthermore, the interactive system may enable the user to receive such feedback without the need to refer to external devices, such as a mobile phone or kiosk, thereby providing a more immersive and enjoyable experience.

Turning now to the drawings, FIG. 1 illustrates a schematic of an interactive system 10 including a reader system 12 (e.g., radio-frequency identification [RFID] reader system) and a wearable device 14. In one embodiment, the wearable device 14 is a wearable or portable device, such as a bracelet, necklace, charm, pin, or toy, that may be worn or carried by a user as the user travels through an attraction. As discussed in more detail below, the reader system 12 is capable of communicating with the wearable device 14 through electromagnetic radiation, and the communication enables tracking of the user's progress through the attraction (e.g., number of rides completed, areas visited, interactive elements contacted, costumed characters met, virtual achievements won). The communication also enables the wearable device 14 to provide feedback indicative of the progress and/or various interactions to the user through a feedback response (e.g. light, sound, or haptics) output by the wearable device 14.

As illustrated in FIG. 1, one embodiment of the reader system 12 includes a first reader 16 and a second reader 18 that are communicatively coupled to a computing system 20 (having a memory 54 and a processor 56) that accesses information stored in one or more databases 22 (e.g., cloud-based storage system.) Generally, the first reader 16 and the second reader 18 transmit electromagnetic radiation (e.g., signals) to the wearable device 14. In one embodiment, the first reader 16 transmits signals 24 of one frequency (e.g., range) and the second reader 18 transmits signals 26 of another frequency (e.g., range) that is different from the first frequency. In addition to transmitting signals 24, 26, the first reader 16 and the second reader 18 can receive signals, such as signals from the wearable device 14 and signals from the computing system 20. In one embodiment, the computing system 20 instructs the readers (e.g., the first reader 16 and the second reader 18) to send signals 24, 26 to the wearable device 14 based on information stored in data encoded in the one or more databases 22. Thus, it should be appreciated that the first reader 16 and the second reader 18 may be transceivers that are capable of both sending and receiving signals.

As illustrated in FIG. 1, one embodiment of the wearable device 14 includes a first RFID tag 28, a second RFID tag 30, a microcontroller 32, one or more light emitting diodes (LEDs) 34a, 34b, 34c, 34d, and power circuitry 36 that cooperate to enable the wearable device 14 of the interactive system 10 to function as disclosed. As illustrated, the wearable device 14 has four LEDs 34; however, it should be appreciated that the wearable device 14 may have fewer or more LEDs 34. The first RFID tag 28 and the second RFID tag 30 each include an antenna 38 that transmits and receives signals, a memory 40 storing information (e.g., unique identification code), a microchip 42, and an integrated circuit 44 to power the microchip 42. Additionally, the integrated circuit 44 powers the power circuitry 36, which provides power to the microcontroller 32. In one embodiment, the power circuitry 36 may include a capacitor configured to store power. As shown, the microcontroller 32 of the wearable device 14 includes a memory 46 and a processor 48. The memory 46 stores computer-readable instructions that are executed by the processor 48 to control operation of the microcontroller 32.

In general, the antennae 38 of the first RFID tag 28 receives signals 24 from the first reader 16, and the antenna 28 of the second RFID tag 30 receive signals 26 from the second reader 18 of the reader system 12. The microcontroller 32 identifies interactions between the tags 28, 30 and the readers 16, 18 and sends signals (e.g., control signals) to one or more of the LEDs 34 to provide feedback to the user. In one embodiment, the wearable device 14 of the interactive system 10 may contain additional or alternative feedback devices, such as audio devices configured to emit sound or haptics configured to provide a tactile output (e.g., vibration). Additionally or alternatively, backscatter indicative of a unique identification code is emitted by the first RFID tag 28 and/or the second RFID tag 30, and the backscatter is utilized by the computing system to track the user's progress (e.g., game statistics) as the user travels through the attraction.

More particularly, the first reader 16 of the reader system 12 continuously transmits signals 24. The antenna 38 of the first RFID tag 28 is configured to receive electromagnetic radiation (e.g., signals 24) from the first reader 16, as well as transmit signals 50 to the first reader 16. The integrated circuit 44 converts the electromagnetic radiation received by the antenna 38 into electricity to provide power to the microchip 42, which generates a backscatter (e.g., signal 50). The backscatter contains information (e.g., unique identification code) stored in the memory 40 of the first RFID tag 28. The backscatter (e.g., signal 50) is received by the first reader 16, which may send a signal to the computing system 20. The computing system 20 may process the signal to determine the identity of the user associated with the wearable device 14 (e.g., the user may register the wearable device 14 to associate the wearable device 14 with the user prior to experiencing the attraction) and/or to update information (e.g., game statistics) for the wearable device 14 in the one or more databases 22. In this manner, the interactive system 10 may track the user's progress (e.g., game statistics) as the user travels through the attraction. It should be noted that the user is tracked based on tracking features associated with the user, such as the wearable device 14 (or some other device that may be transported by the user).

Furthermore, once power is supplied to the microcontroller 32, the processor 48 of the microcontroller 32 may also receive and process a signal from the first RFID tag 28 that indicates that the signal 24 from the first reader 16 was received at the first RFID tag 28. The processor 48 of the microcontroller 32 may then execute instructions stored on the memory 46 of the microcontroller 32 to illuminate one or more of the LEDs 34a, 34b, 34c, 34d to provide feedback to the user. In one embodiment, the microcontroller 32 may be programmed to provide a certain type of illumination (e.g., number of lights, color, blinking pattern, length of time) in response to the signal that indicates that the signal 24 from the first reader 16 was received at the first RFID tag 28. For example, when the first RFID tag 28 receives the signal 24 from the first RFID reader 16, the microcontroller 32 may cause a first LED 34a to illuminate. In one embodiment, the signals 24 transmitted by the first reader 16 are ultra-high frequency (UHF) signals (e.g., having a frequency between approximately 300 megahertz and 3 gigahertz). As such, the first RFID tag 28 may receive signals 24 from the first reader 16 when the first RFID tag 28 is located a relatively far distance (e.g., up to approximately 3, 4, 5, 6, 7, 8, or more meters) away from the first reader 16.

Additionally, the second reader 18 may continuously transmit signals 26. The antenna 38 of the second RFID tag 30 is configured to receive electromagnetic radiation (e.g., signals 26) from the second reader 18. The integrated circuit 44 converts the radiation received by the antenna 38 into electricity to provide power to the microchip 42, which generates a backscatter (e.g., signal 52). The backscatter contains information (e.g., unique identification code) stored in the memory 40 of the second RFID tag 30. It should be appreciated that in some embodiments, the information stored in the respective memories 40 of the first RFID tag 28 and the second RFID tag 30 may be linked (e.g., the backscatter generated in response to receipt of the signals 26 at the second RFID tag 30 may contain the information stored in the memory 40 of the first RFID tag 28), or the first RFID tag 28 and the second RFID tag 30 may share one memory 40 (e.g., be a dual RFID tag capable of receiving different frequency signals). The backscatter (e.g., signal 52) is received by the second reader 18, which may send a signal to the computing system 20. The computing system 20 may process the signal to determine the identity of the user associated with the wearable device 14 and/or to update information (e.g., game statistics) for the wearable device 14 in the one or more databases 22. Because the first RFID reader 16 may be associated with a particular area (e.g., room) of the attraction and the second RFID reader 18 may be associated with a particular interactive element (e.g., target) of the attraction, the computing system 20 may track both the general location of the user, as well as the user's interactions with the interactive elements. In this manner, the interactive system 10 may track the user's progress (e.g., game statistics) as the user travels through the attraction.

Furthermore, once power is supplied to the microcontroller 32, the processor 48 of the microcontroller 32 may also receive and process a signal from the second RFID tag 30 that indicates that the signal 26 from the second reader 18 was received at the second RFID tag 30. The processor 48 of the microcontroller 32 may then execute instructions stored on the memory 46 of the microcontroller 32 to illuminate one or more of the LEDs 34a, 34b, 34c, 34d to provide feedback to the user. In one embodiment, the microcontroller 32 may be programmed to provide a certain type of illumination (e.g., number of lights, color, blinking pattern, length of time) in response to the signal that indicates that the signal 26 from the second reader 18 was received at the second RFID tag 30. For example, when the second RFID tag 30 receives the signal 26 from the second RFID reader 18, the microcontroller 32 may cause a second LED 34b to illuminate. In one embodiment, the signals 26 transmitted by the second reader 16 are near-field communication (NFC) signals (e.g., having a frequency between approximately 10 to 20 megahertz). As such, the second RFID tag 30 may receive signals 26 from the second reader 18 when the second RFID tag 30 is within a relatively short distance (e.g., approximately 1, 2, 3, 4, or 5 centimeters) of the first reader 16. Because the first RFID reader 16 may be associated with a particular area (e.g., room) of the attraction and the second RFID reader 18 may be associated with a particular interactive element (e.g., target) of the attraction, the illumination (or other feedback, such as audio or haptics) on the wearable device 14 may provide multiple types of feedback to the user. For example, illumination of the first LED 34*a* in response to receipt of the signals 24 from the first RFID reader 16 may notify the user that the interactive system 10 has detected the user within the particular area of the attraction, while illumination of the second LED 34*b* in response to receipt of the signals 26 from the second RFID reader 18 may notify the user that the interactive system 10 has detected the user's interaction with the particular interactive element.

In general, the second reader 18 operates similarly to the first reader 16; however, the first reader 16 communicates with the first RFID tag 28 (and not the second RFID tag 30), while the second reader 18 communicates with the second RFID tag 30 (and not the first RFID tag 28). The wearable device 14 includes at least two RFID tags 28, 30 that are each configured to communicate with respective readers 16, 18 that transmit signals 24, 26 that travel different distances. The first RFID tag 28 and the first reader 16 that communicate over a relatively long distance enable tracking a general location of the wearable device 14 and charging the wearable device 14, while the second RFID tag 30 and the second reader 18 that communicate over a relatively short distance enable monitoring interactions based on a contact (or close proximity) between the user and interactive elements in the attraction.

In one embodiment, the interactive system 10 may include multiple first readers 16 at different locations within an attraction. As a user moves through the attraction, the user's location is updated in the database 22 based on which first reader 16 is currently communicating with the wearable device 14. In one embodiment, feedback may be provided to the user based on each interaction with each one of the first readers 16. For example, one first reader 16 may be positioned at an entrance of the attraction, and another first reader 16 may be positioned in a room or area of the attraction. In this case, the wearable device 14 provides feedback (e.g., illumination of the first LED 34*a*) upon the user entering the attraction, thereby notifying the user that they have been detected by the interactive system 10. Then, once the user enters the room or area, the wearable devices provides another feedback (e.g., the same feedback or a different feedback, such as illumination of the second LED 34*b*) is illuminated, thereby notifying the user that they have been detected by the interactive system 10 as being within the new area.

In one embodiment, one or more first readers 16 and one or more second readers 18 may cooperate to improve the user's immersive experience. For example, the user may enter an area containing one or more first readers 16. The area may include one or more targets each associated with or proximate to one or more second readers 18. As discussed above, once the wearable device 14 is within a range (e.g., a relatively long range) of one first reader 16 in the area, the wearable device 14 communicates with the one first reader 16, the database 22 is updated, and the wearable device 14 may provide feedback to the user that they have been detected within the area. Additionally, once the wearable device 14 is within a range (e.g., a relatively short range) of one second reader 18 (e.g., due to the user hitting, touching, or walking by the target associated with the one second reader 18), the wearable device 14 communicates with the one second reader 18, the database 22 is updated, and the wearable device 14 may provide feedback to the user that they have successfully interacted with the target (e.g., points have been assigned).

As discussed above, the microcontroller 32 may be programmed to provide some feedback to the user based on interactions between the RFID tags 28, 30 of the wearable device 14 and the readers 16, 18. Additionally or alternatively, the memory 40 of the wearable device 14 may be updated (e.g., one or more of the readers 16, 18 may write to the memory 40 of one or more RFID tags 28, 30), thereby enabling the wearable device 14 to provide other feedback, such as feedback indicative of the user's progress (e.g., level within a game), wait times, or the like. For example, upon detecting the user's first interaction with the second reader 18, the computing system 20 may instruct the first reader 16 to write data to the respective memory 40 of the first RFID tag 28 that cause the microcontroller 32 (e.g., when received and processed by the microcontroller 32) to illuminate the first LED 34*a*. However, upon determining that the user has completed a predetermined number of successful interactions with targets (e.g., based on communications between the second RFID tag 30 and the second readers 18 associated with the targets), the computing system 20 may instruct the first reader 16 to write data to the respective memory 40 of the first RFID tag 28 that cause the microcontroller 32 to illuminate multiple LEDs (e.g., LEDs 34*a-d*, or any combination thereof) and/or trigger a feedback response via a speaker or haptics. Thus, feedback is provided to the wearable device 14 based on information stored in the database 22. For example, the database 22 may contain information about the user's progress based on their interactions with one or more first readers 16 and second readers 18 throughout the attraction, and the feedback may be provided once certain conditions are met (e.g., level or points achieved). In this way, the wearable device 14 may provide feedback indicative of the user's overall progress or performance.

In one embodiment, the user may prompt or request the feedback by entering a particular area (e.g., a status update area) having one or more first readers 16, and communication between one of these first readers 16 and the first RFID tag 28 of the wearable device 14 may cause the computing system 20 to instruct the first reader 16 to write the data to the respective memory 40 of the first RFID tag 28 to provide the feedback indicative of the user's progress. In one embodiment, the user may receive such feedback indicative of the user's progress each time the first RFID tag 28 communicates with one first reader 16 and/or one second reader 18. Thus, the user may be repeatedly updated regarding the progress as the user travels through the attraction.

In one embodiment, the LEDs 34*a-d* may be used to provide an indication of a wait time for an attraction. For example, upon detecting that the user is approaching the attraction (e.g., based on communications between the first RFID tag 28 and the first reader 16 proximate to an entrance of the attraction), the computing system 20 may instruct the first reader 16 to write data to the respective memory 40 of the first RFID tag 28 that cause the microcontroller 32 (e.g., when received and processed by the microcontroller 32) to illuminate the LEDs 34*a-d* in a manner that conveys the wait time. For example, at least one LED 34 may be multicolored (e.g., configured to emit red, yellow, and green light), and each color indicates an approximate wait time (e.g., a first color indicates a wait time greater than 15 minutes, a second color indicates a wait time less than 5 minutes, and a third color indicates no wait). Because multiple first readers 16 may be located throughout the attraction or amusement park, the user may continue to receive feedback about the wait time (e.g., because other first readers 16 may write data to the respective memory 40 of the first RFID tag 28) even after the user moves out of the range of the first reader 16 that is proximate to the entrance of the attraction. In one embodiment, each LED 34 may represent an approximate wait time (e.g., 5, 10, 15 minutes), such that the number of LEDs 34 illuminated provides an indication of the wait time (e.g., four LED's indicates a wait time of 60 minutes or more, three LED's indicates a wait time of 45 minutes or more, two LED's indicates a wait time of 30 minutes or more, and one LED indicates a wait time of 15 minutes or more). In one embodiment, the LEDs 34 may represent a countdown timer. For example, upon detecting that the user is approaching the attraction, all LEDs 34a-d are initially illuminated and then are sequentially turned off as the countdown timer runs out.

As noted above, in one embodiment, the antenna 38 of the first RFID tag 28 may only receive UHF waves, while the antenna 38 of the second RFID tag 30 may only receive NFC waves. For example, the first RFID tag 28 may only communicate (e.g., receive or transmit) with UHF waves, and the second RFID tag 30 may only communicate with NFC wave. As UHF signals travel a longer distance, the second RFID tag 30 may frequently or continuously receive the UHF signals emitted by the first readers 16 as the user travels through the attraction, but the first RFID tag 28 may only receive the NFC signals emitted by the second readers 18 when the user positions the wearable device 14 close to the second readers 18. Thus, in one embodiment, the UHF signal may be used for powering or charging the wearable device 14 (e.g., via power harvesting by the integrated circuit 44 and power circuitry 36).

It should be appreciated that the interactive system 10 may track multiple users and provide feedback on multiple wearable devices 14. For example, multiple users may each wear a respective wearable device 14 that is configured to communicate with multiple first readers 16 and second readers 18 (e.g. a third type of reader for communicating at a third range and/or frequency) disposed in different locations within the attraction. It should also be appreciated that in one embodiment, the wearable device 14 of the interactive system 10 may include a single RFID tag (e.g., a dual-frequency RFID tag) that is capable of communicating with signals of a first frequency (e.g., a range of frequencies) and signals of a second frequency (e.g., another range of frequencies) to facilitate the techniques disclosed herein.

Figure 2:
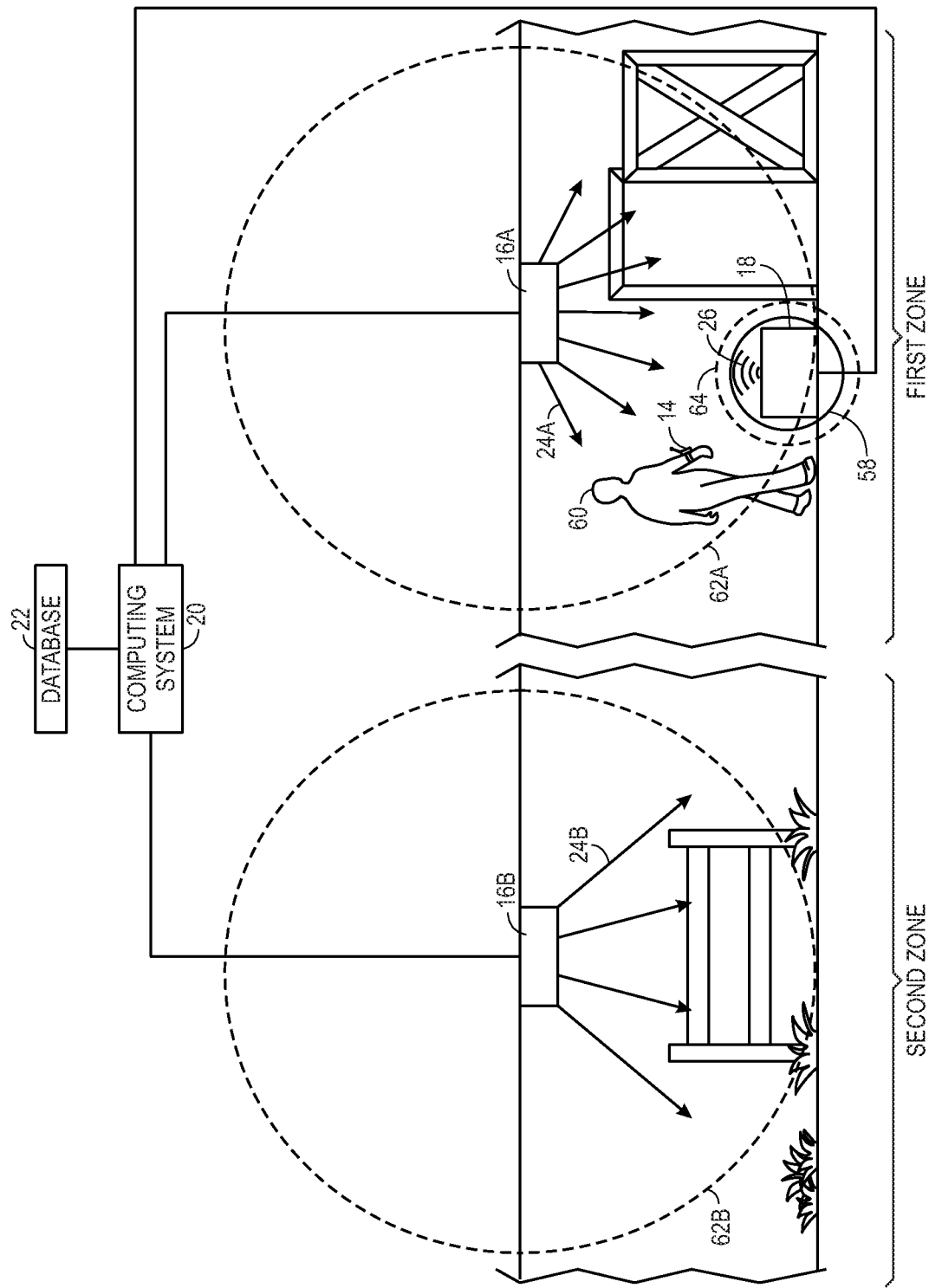
FIG. 2 is an illustration showing communication between a reader and a wearable device that may be used in the interactive system of FIG. 1, in accordance with an embodiment of the present disclosure.

FIG. 2 is an illustration of one embodiment of the interactive system 10. As illustrated, the interactive system 10 includes two first readers 16a and 16b, the second reader 18 disposed within or proximate to a target 58, and the wearable device 14 worn by a user 60. The first readers 16a and 16b and the second reader 18 are communicatively coupled to the computing system 20 and the database 22. The first reader 16a continuously emits a signal 24a that may be received by the first RFID tag 28 of the wearable device 14 within a first area 62a (e.g., zone or room of an attraction), and similarly, the first reader 16b continuously emits a signal 24b that may be received by the first RFID tag 28 of the wearable device 14 within a second area 62b once the user 60 travels into the second area 62b. As such, depending on the location of the user 60, the wearable device 14 may communicate (e.g., receive signals/electromagnetic radiation, backscatter information) with one or both of the first reader 16a in the first area 62a or the first reader 16b in the second area 62b. Based on which first reader (e.g., 16a or 16b) communicates with the wearable device 14, the computing system 20 determines the location of the user 60 and updates the database 22 with data indicative of the location of the user 60. Additionally, as the wearable device 14 of the user 60 communicates with the first reader 16a or the first reader 16b, power is harvested and provided to the microcontroller 32. Thus, the microcontroller 32 begins to process signals received from the first RFID tag 28 and/or read data written to the memory 40 of the first RFID tag 28. For example, the microcontroller 32 may receive a signal from the first RFID tag 28 that indicates that the first RFID tag 28 has communicated with one of the first readers 16 and may provide a corresponding feedback response (e.g., illuminate one or more LEDs). As noted above, the first RFID tag 28 may receive a signal from the first reader 16 that writes data to the memory 40 of the first RFID tag 28 that causes the microcontroller 32 to provide a particular feedback response.

As shown in FIG. 2, the second reader 18 is disposed within or proximate to the target 58. The target 58 may be any variety of objects of features within the attraction. In one embodiment, the target 58 is a stationary physical object; however, the target 58 may be a virtual object (e.g., image, virtual element, graphical element on a display screen) or a movable object, such as a costumed character traveling about the attraction. The second reader 18 emits the signal 26 that is receivable within an area 64. In operation, when the user 60 brings the wearable device 14 within the area 64, the wearable device 14 is in communication with the second reader 18. As a result, the second RFID tag 30 of the wearable device 14 emits a backscatter that includes information that identifies the wearable device 14. The second reader 18 sends this information to the computing system 20 to indicate that the user 60 has been detected by the second reader 18, and thus, has interacted with the target 58. Furthermore, the microcontroller 32 may receive a signal from the second RFID tag 30 that indicates that the second RFID tag 30 has communicated with the second reader 18 and may provide a corresponding feedback response (e.g., illuminate one or more LEDs).

At certain times, the user 60 may not be in either area 62a or 62b, and thus, may not receive signals 24a and 24b from the first readers 16a and 16b. In one embodiment, the wearable device 14 may utilize power stored in the power circuitry 36 to continue to provide power (e.g., for 5, 15, 30, 60 or more seconds) even while outside of the areas 62a and 62b. Accordingly, the wearable device 14 may provide feedback (e.g., illuminate LEDs to indicate progress, wait time, or the like) even while the user is outside of the areas 62a and 62b, thereby providing more time for the user to observe the feedback response. In one embodiment, the feedback response (e.g., illumination of the LEDs) may stop when the user 60 leaves the area 62a defined by the signals 24a emitted from the first reader 16a.

Figure 3:
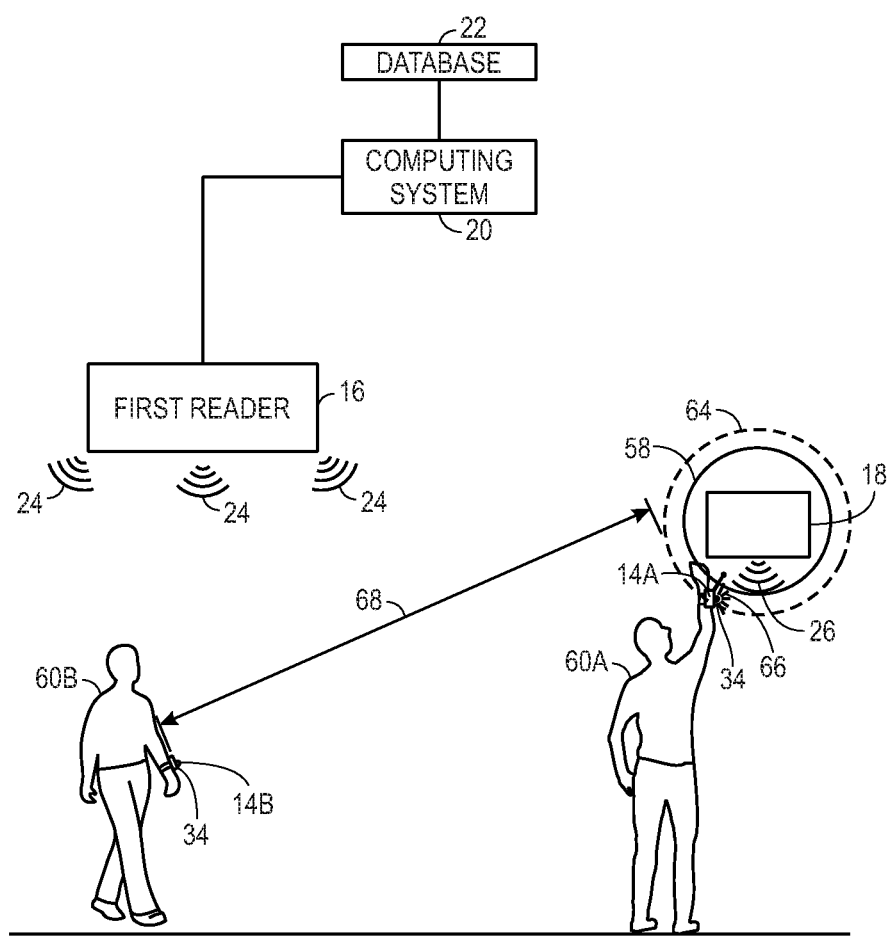
FIG. 3 is an illustration showing communication between a reader and multiple wearable devices that may be used in the interactive system of FIG. 1, in accordance with an embodiment of the present disclosure.

FIG. 3 is an illustration of one embodiment of the interactive system 10 including a first user 60a, a second user 60b, the second reader 18 disposed within or proximate to the target 58, and the first reader 16. The second reader 18 and the first reader 16 are communicatively coupled to the computing system 20 and the database 22. Additionally, the second reader 18 is emitting the signal 26 across the area 64. The first user 60a is wearing a first wearable device 14a including one or more LEDs 34, and the second user 60b is a wearing a second wearable device 14b including one or more LEDs 34. In one embodiment, the second reader 18 has a relatively small communication range, and thus, communicates with the wearable device 14 when the user makes physical contact with the target 58 containing the second reader 18 or when the wearable device 14 is otherwise brought within the area 64. Further, the first reader 16 has a relatively long communication range, and thus, is continuously communicating with the wearable devices 14a and 14b through electromagnetic radiation.

In operation, when the first user 60a makes contact with (e.g., touches or hits) the target 58 containing the second reader 18, the wearable device 14 provides feedback 66 through the illumination of the one or more LEDs 34. More specifically, the contact the first user 60a makes with the second reader 18 brings the first wearable device 14a (specifically, the second RFID tag 30 of the first wearable device 14a) within the range of the second reader 18. Because the second user 60b is at a distance 68 outside of the range of the second reader 18, the second user 60b does not receive feedback from the one or more LEDs 34 of the second wearable device 14b. In an embodiment, both the first user 60a and the second user 60b might both be within the range of the second reader 18 (e.g., by simultaneously contacting the target 58). In such cases, the LEDs 34 from both the first wearable device 14 and the second wearable device 14b would illicit a suitable feedback.

Figure 4:
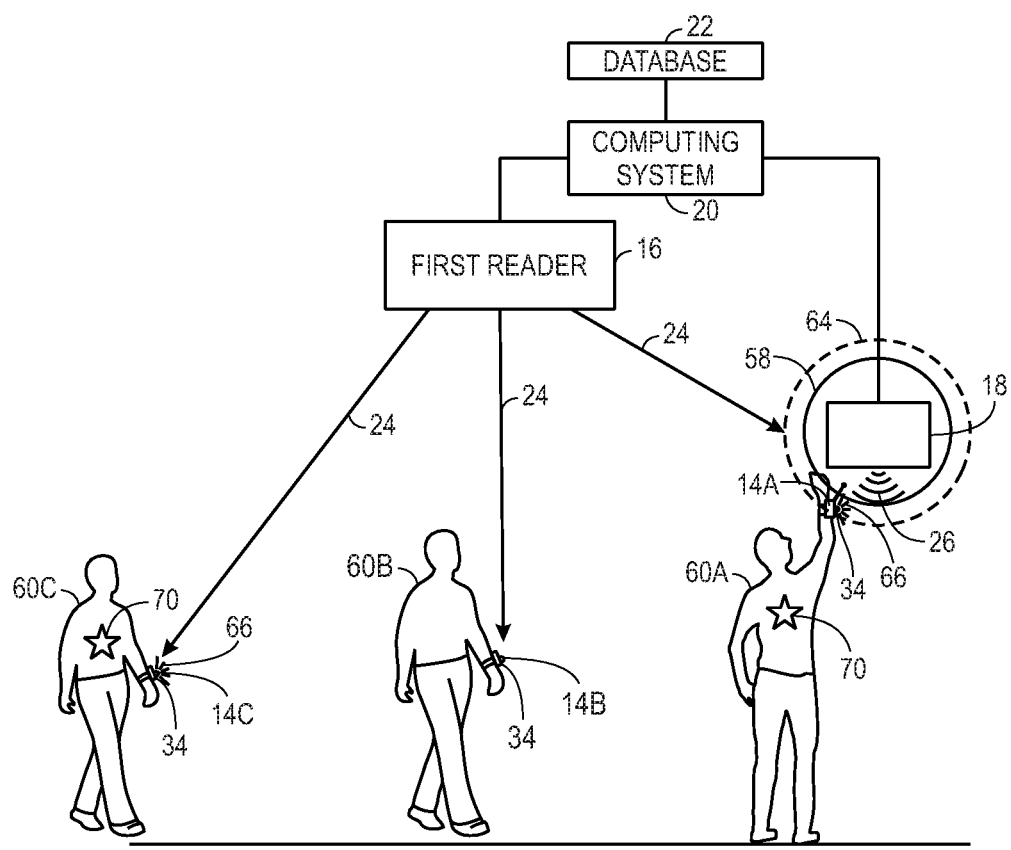
FIG. 4 is an illustration of a team feedback that may be provided by the interactive system of FIG. 1, in accordance with an embodiment of the present disclosure.

FIG. 4 shows an embodiment of the interactive system 10 illustrating a team feedback. As illustrated in FIG. 4, there is a first user 60a, a second user 60b, a third user 60c, the second reader 18, and the first reader 16. The second reader 18 and the first reader 16 are electronically coupled to the computing system 20 and the database 22. The first user 60a, the second user 60b, and the third user 60c have a first wearable device 14a, a second wearable device 14b, and a third wearable device 14c, respectively, which each have one or more LEDs 34. The first user 60a and the third user 60c are part of a team, and as such, may wear a team indicator 70 that distinguishes the first user 60a and the third user 60c from the second user 60b. In one embodiment, the team indicator may be a physical characteristic of the wearable device 14 (e.g., color, shape, pattern). In one embodiment, the team may be based on information stored in the database 22 (e.g., a family or other users linked together by team selection or characteristics). As such, the first user 60a and the third user 60c are on a first team (e.g., team A), and the second user is on a second team (e.g., team B).

As shown in FIG. 4, the first wearable device 14a worn by the first user 60a is within the area 64 to interact with the signal 26 emitted by the second reader 18. The second reader 18 receives information from the memory 40 of the second RFID tag 30 of the first wearable device 14a from the backscatter, as discussed above. The information is sent to the computing system 20, which then identifies the first user 60a based on the information. Additionally, based on the information stored in the database 22, the computing system 20 determines that the first user 60a is on team A. As a result, the computing system 20 sends a signal (e.g., control signal) instructing the first reader 16 to send electromagnetic radiation to the wearable devices 14a and 14c of the first and third users 60a, 60c, to write data to the memory 40 of the respective first RFID tags 28. The respective microcontroller 32 of each wearable devices 14a and 14c reads the data written to the memory 40 of the respective first RFID tags 28. The updated memory 40 includes data that, when read by the microcontroller 32, causes the microcontroller 32 to initiate a particular feedback response.

As illustrated, the feedback response is provided via illumination of the LEDs 34 of the first wearable device 14a and the third wearable device 14c. Thus, a single interaction between one user (e.g., the first user 60a) and the target 58 can result in all users on a team receiving feedback due to the interaction. In one embodiment, users of the same team may be in a different zone (e.g., not receiving signals from the same first reader 16) but may still receive feedback as all first readers 16 may be communicatively coupled to a computing system 20. In one embodiment, the feedback is only provided to users receiving signals 24 from the same readers 16. In one embodiment, all users of the same team regardless of which first reader 16 they are receiving the signal 24 from, receive the feedback.

Figure 5:
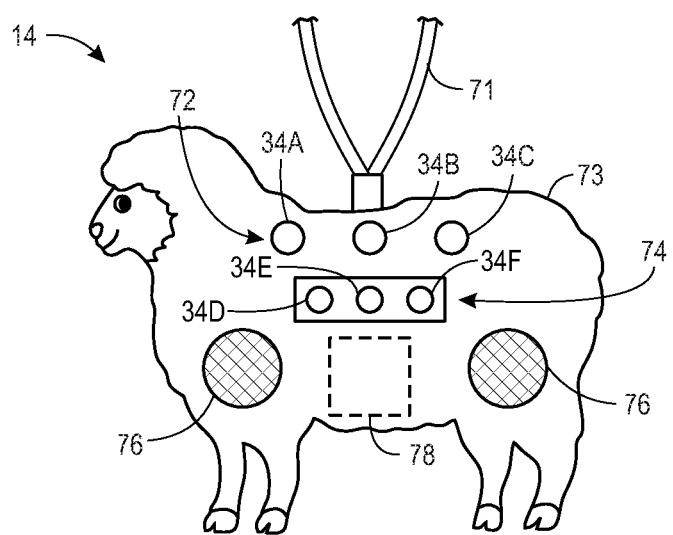
FIG. 5 is a front view of a wearable device that may be used in the interactive system of FIG. 1, in accordance with an embodiment of the present disclosure.

FIG. 5 shows an illustration of the wearable device 14, in accordance with an embodiment of the present techniques. While the wearable device 14 is shown with a lanyard 71 (e.g., rope or string) coupled to a housing 73, it should be appreciated that the wearable device 14 may have any suitable form. For example, the wearable device 14 may include a strap (e.g., to secure the housing 73 to a wrist of the user), or the wearable device 14 may be a charm or toy that is carried by the user. As shown, the wearable device 14 includes a first LED display 72, a second LED display 74, an audio device 76 (e.g., speaker), and haptics 78 (e.g., vibration device). Any combination of the LEDs 34, haptics 78, audio device 76, or other feedback devices might be activated to provide feedback to a user. It should be appreciated that the wearable device 14 may include only one of these feedback devices or any combination of these feedback devices.

As shown, the wearable device 14 may include multiple LED displays (e.g., the first LED display 72 and the second LED display 74), and each LED display may provide various types of feedback. For example, the first LED display 72 may provide feedback indicative of interactions with the one or more first readers 16 and/or the one or more second readers 18, while the second LED display 72 may provide feedback indicative of a wait time for an attraction. As illustrated in FIG. 5, the first LED display 72 and the second LED 74 display each include three LEDs (34a-c and 34d-f, respectively). In one embodiment, the wearable device 14 may include any number of LED displays with any number of LEDs (e.g., 1, 2, or more than 2 LED displays containing one or multiple LEDs). In one embodiment, a single LED display (e.g., the LED display 72) may provide some or all of the various types of feedback disclosed herein.

Figure 6:
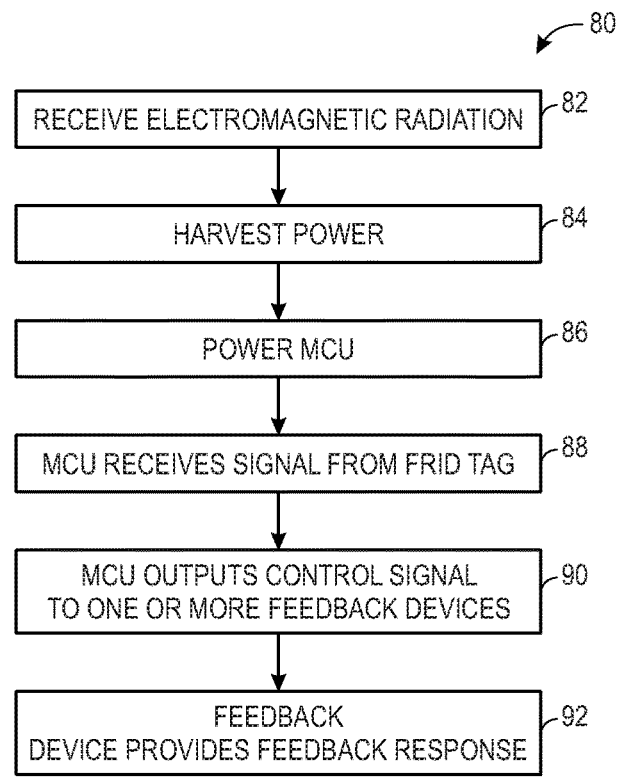
FIG. 6 is a flow diagram, illustrating a process for operating the interactive system of FIG. 1, in accordance with an aspect of the present disclosure.

FIG. 6 is a flow diagram illustrating of one embodiment of a process 80 for operating the wearable device 14, in accordance with present techniques. It is to be understood that the steps discussed herein are merely exemplary, and certain steps may be omitted or added, and the steps may be performed in a different order. In one embodiment, the process 80 may be executed by the first RFID tag 28 and/or the second RFID tag 30 in cooperation with the microcontroller 32 of the wearable device 14.

The process 80 begins with the antenna 38 of the first RFID tag 28 and/or the second RFID tag 30 receiving electromagnetic radiation from a respective first reader 16 or second reader 18 (block 82). As discussed above, after the antenna 38 receives electromagnetic radiation, the antenna 38 returns a backscatter with information stored within the memory 40 of the RFID tag 28, 30 to the respective reader 16. 18. In one embodiment, this information may include an identification number that is specific to the wearable device 14, and thus, identifies a user (e.g., user using the wearable device 14). In one embodiment, the electromagnetic radiation emitted by the first reader 16 travels a relatively long distance, and the electromagnetic radiation emitted by the second reader 18 travels a relatively short distance. The first RFID tag 28 is capable of communicating with the first reader 16, and the second RFID tag 30 is capable of communicating with the second reader 18.

Once the wearable device 14 has received electromagnetic radiation, the wearable device 14 harvests power (block 84) from the electromagnetic radiation. As discussed above, the first RFID tag 28 and the second RFID tag 30 may each include an integrated circuit 44 that powers the microchip 42. Additionally, the integrated circuit 44 powers the power circuitry 36, which provides power to the microcontroller 32 (block 86) and other components of the wearable device (e.g., feedback devices). In one embodiment, the power circuitry 36 may include a capacitor or battery that is electrically coupled to a receiver coil and that stores power upon the wearable device 14 receiving signals from the first reader 16 and/or the second reader 18.

Once the microcontroller 32 is powered, the processor 48 executes the command stored in the memory 46 to receive and/or process signals from the first RFID tag 28 and/or second RFID tag 30 (block 88). In one embodiment, the microcontroller 32 may be programmed to continually or periodically query the first RFID tag 28 and/or the second RFID tag 30 when powered.

The microcontroller 32 then outputs a signal (e.g., control signal) to one or more feedback devices (block 90.) In one embodiment, the control signal may result in one or more of the LEDs 34 and/or other feedback devices (e.g., audio devices, haptics) being activated. In one embodiment, the control signal is a variable voltage applied to one LED 34, which results in a change in the intensity of the LED 34. In one embodiment, the signal is an oscillating voltage signal that results in the LED 34 blinking.

The feedback devices (e.g., LEDs, haptics, audio device) provide a feedback response to the user (block 92). The feedback response may be provided in response to interactions between the wearable device 14 and the reader systems 12 disposed in the attraction. For example, a feedback response may include lighting up one LED 34 to notify a user that they have entered a zone of the first reader 16 (e.g., the user's wearable device 14 is successfully communicating with the first reader 16) or successfully interacted with an interactive elements, such as the target 58.

As noted above, the memory 40 of the first RFID tag 28 and/or the second RFID tag 30 may be written to by the first reader 16 and/or the second reader 18. Accordingly, the user may receive a feedback response upon achieving a goal based on information tracked in the database 22 (e.g., leveling up, reaching a high score). In one embodiment, a feedback response may result from a different user successfully achieving a goal (e.g., if the users are on the same team). In one embodiment, a feedback response may include one or more LEDs 34 that indicate a time (e.g., a wait time or a remaining time in an area of the attraction). In one embodiment, a feedback response may include a sound from an audio device 76 of the wearable device 14 to indicate that the user needs to perform an action (e.g., begin a race, move to the next zone, participate in a game) In one embodiment, an increasing volume of sound from the audio device 76, intensity of LED illumination, or intensity of haptic 78 might indicate progression toward a goal in the attraction, for example.

Accordingly, the present disclosure is directed to an interactive system having a reader system and a wearable device that emits a feedback response based on the communication between RFID tags of the wearable device and readers of the reader system. More specifically, the reader system includes readers (e.g., one or more first readers 16 and one or more second readers 18) that, in operation, communicate (e.g., transmit and receive signals) with a first RFID and a second RFID of a wearable device through electromagnetic radiation. The readers continuously emit electromagnetic radiation within a range (e.g., communication range), and upon the wearable device entering that range, the readers communicate with the wearable device. For example, one reader (e.g., the first reader) may have a communication range that is larger than the communication range of another reader (e.g., the second reader). As such, the first reader generally communicates with the first RFID of the wearable device more often and/or at different times than the second reader communicates with the second RFID. A reader that communicates with a RFID tag more regularly, or for longer periods of time, may be more suitable for powering a power harvesting device, and thus, enabling feedback devices (e.g., audio devices, haptics, one or more LEDS) to be included in the wearable device that may need more power to operate. In one embodiment, the RFID readers are disposed in stationary targets that guests can interact (e.g., touch or hit). In one embodiment, the RFID readers are disposed in moveable targets (e.g., disposed within the costume of a character at an amusement park.)

Local Interaction Processing and Promulgation

As may be appreciated, it may be desirable to provide complex and/or fast-paced immersive and/or interactive attractions at amusement parks. These attractions may include a significant number of interaction points that enable interactivity with the attraction. Data from these interaction points may be used to continually process status updates for the attraction for a significant number of attraction participants. Further, the attractions may provide time-sensitive challenges to the attraction participants. Accordingly, to facilitate such attractions, it may be useful to reduce processing time between an interaction of a wearable device 14 and the reader system 12 and feedback provided based upon the interaction. In this manner, data processing delays may be increasingly less perceptible to the attraction participants. Accordingly, the following discussion focuses on localized interaction processing to facilitate rapid response to interaction between a wearable device 14 and local interaction points (e.g., reader systems 12).

Figure 7:
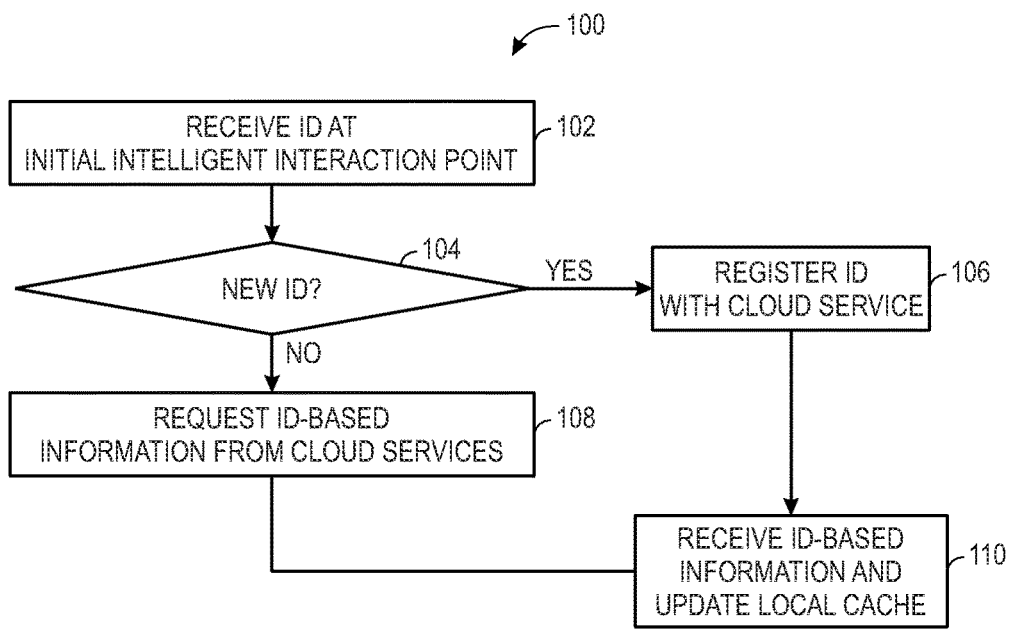
FIG. 7 is a flow diagram, illustrating a process for pre-heating local interaction points of the interactive system for interaction with a wearable device, in accordance with an aspect of the present disclosure.
Figure 8:
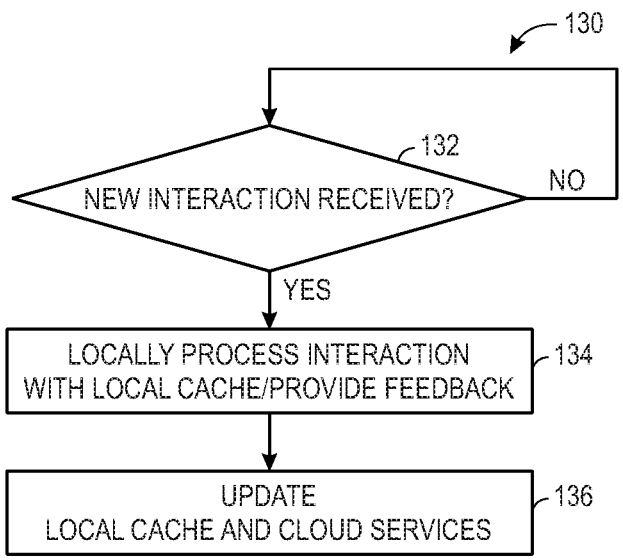
FIG. 8 is a flow diagram, illustrating a process for facilitating interaction between a local interaction point and a wearable, in accordance with an aspect of the present disclosure.
Figure 9:
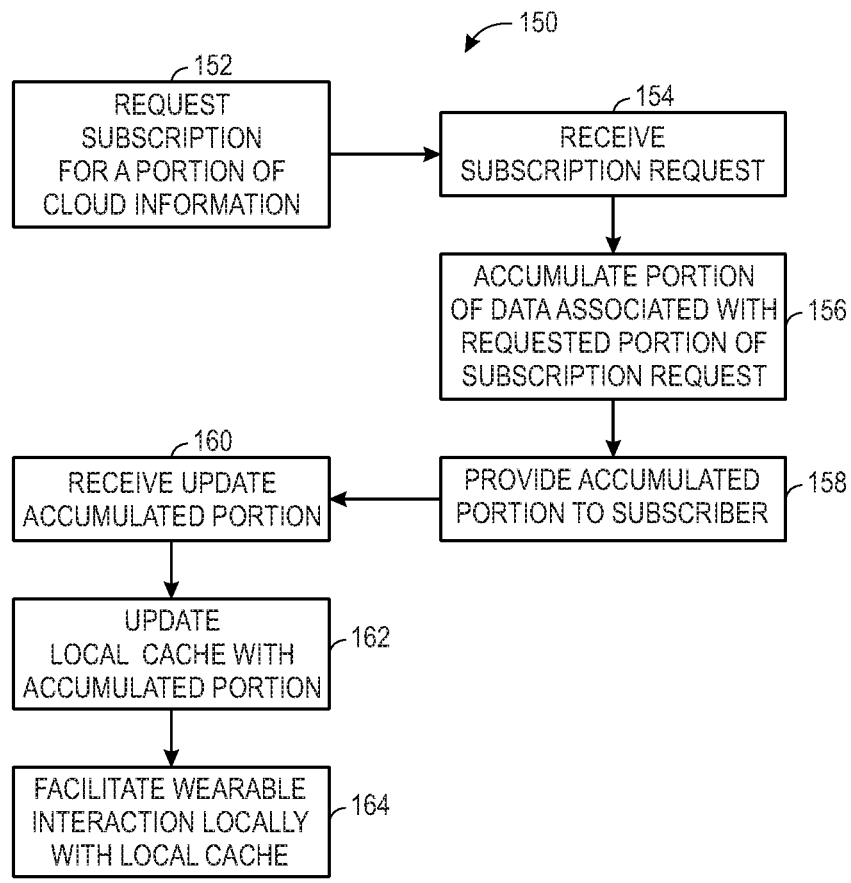
FIG. 9 is a flow diagram, illustrating a process for updating local interaction points within the interactive system, based upon a local interaction with a local interaction point, in accordance with an aspect of the present disclosure.
Figure 10:
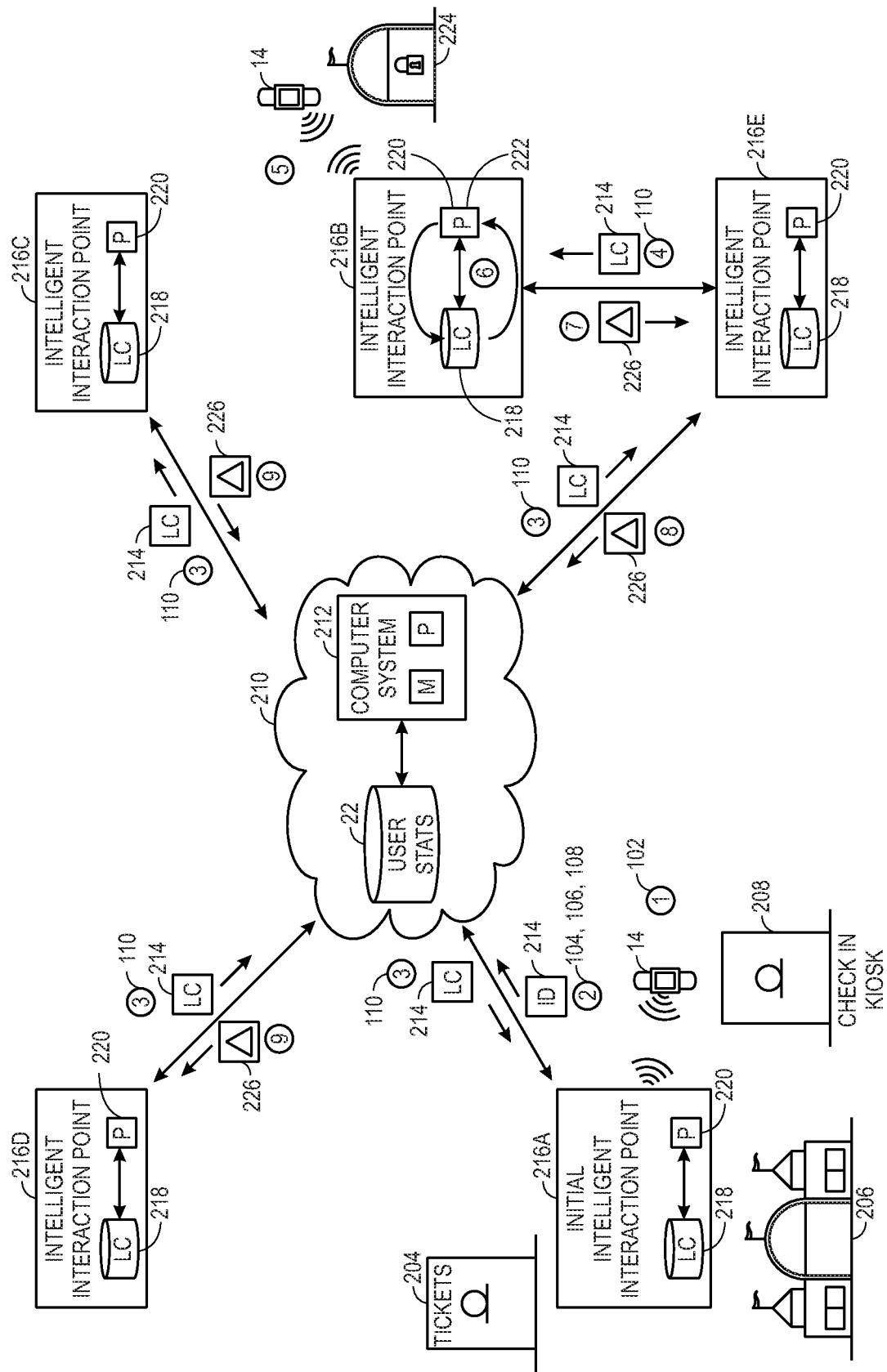
FIG. 10 is a schematic diagram of an interactive system, illustrating data flow and processing in accordance with the processes of FIGS. 7-9, in accordance with aspects of the present disclosure.

FIG. 7 is a flow diagram, illustrating a process 100 for pre-heating local interaction points of the interactive system for interaction with a wearable device, in accordance with an aspect of the present disclosure. FIG. 8 is a flow diagram, illustrating a process 130 for facilitating interaction between a local interaction point and a wearable, in accordance with an aspect of the present disclosure. FIG. 9 is a flow diagram, illustrating a process 150 for updating local interaction points within the interactive system, based upon a local interaction with a local interaction point, in accordance with an aspect of the present disclosure. FIG. 10 is a schematic diagram of an interactive system 200, illustrating data flow and processing in accordance with aspect of the present disclosure. For clarity, the figures will be discussed together.

i. Pre-Heating Interaction Points for Localized Processing and Feedback

As mentioned above, increased response rates for an interaction may greatly increase an attraction participant's experience. One way to do this is to process feedback at local interaction points, rather than requiring centralized processing of interaction data and returning feedback to the local interaction point. To do this, local interaction points may be pre-heated or pre-loaded with applicable participant information that may be useful for a local interaction at the local interaction point. For example, one local interaction point may permit access to an area when a participant collects three keys. Accordingly, prior to interaction with the local attraction, information pertaining to the participant's key acquisitions may be pre-loaded at the local interaction point. Thus, upon an interaction with the local interaction point, an immediate decision regarding permitting access may be determined locally, rather than by polling a remote data store for key acquisition information.

As mentioned above, FIG. 7 is a flow diagram, illustrating a process 100 for pre-heating local interaction points of the interactive system for interaction with a wearable device, in accordance with an aspect of the present disclosure. The process 100 begins by receiving an identifier of a wearable device 14 at an initial interaction point (block 102). The reception of the identifier may provide an indication that the wearable device 14 is participating in interactions within the attraction.

FIG. 10 illustrates an interactive system 200 (e.g., made up of inspection points 216A-E that form a point-to-point mesh network, where each or some of the inspection points 216A-E relay information to other of the inspection points 216A-E or to the cloud services 210). An initial interaction point 216A, may be placed at a starting point for the attraction, such as at a ticket booth 204, an attraction entry 206, a check-in kiosk 208, etc. In some embodiments, the initial interaction point 216A may be designated as any interaction point 216A-E that does not have entries associated with an interacting wearable device 14 identifier stored in its local cache 218. The initial interaction point 216A may receive the identifier of the wearable device 14 (e.g., via RFID communications, as discussed above).

User interaction data with the attraction may be maintained, such that participants may continue where they left off during a previous visit to the attraction. Accordingly, upon receiving the identifier, a determination is made as to whether the identifier is a previously used identifier within the system 200 (decision block 104). In some embodiments, this may be facilitated by providing an electronic query from the initial interaction point 216A to cloud services 210, such as a computing system 212 that stores a persistent copy of the participant's interactivity data (e.g., the participant's status within the attraction based upon the participant's interaction with the attraction) in the user statistics data store 22.

If the identifier of the wearable device 12 is new, meaning is does not have associated data in the user statistics data store 22, the identifier is registered with the cloud services 210 (block 106). This results in an initial set of data (e.g., starting status) being stored and associated with the identifier in the user statistics data store 22. Otherwise, if the identifier of the wearable device 12 is not new, a request is provided to pre-load the stored information for the identifier to the attraction's interaction points (block 108).

Based upon the registration and/or data request, local cache entries 214 are provided by the cloud services 210 to the initial interaction point 216A and/or other interaction points (e.g., 216B-E in the depicted embodiment of FIG. 10). The local cache entries 214 may differ for the interaction points 216A-E. For example, each interaction point 216A-E may provide a subscription of data that it wishes to receive. Returning to our earlier example, one interaction point 216 may be concerned with data relating to key acquisition, accordingly it may subscribe to key acquisition data. Another interaction point 216A-E may be concerned with virtual coin collection or other progress-related data for an attraction and, thus, may subscribe specifically to data related to virtual coin collection.

When a newly registered wearable device 14 is used, initial data is provided in the local cache entries 214. For example, attraction starting-state data may be generated and associated with the newly registered wearable device 14. Returning to our previous example, the initial data could provide an indication that no virtual coins and/or keys have yet been acquired.

However, in some instances, the wearable device 14 may have been previously used at the entertainment attraction, resulting in saved state data. For example, a participant using the wearable device 14 may have acquired a certain number of virtual coins, acquired a certain number of keys, accessed certain controlled-access portions of the attraction (e.g., unlocked gates), attained higher status levels in the attraction, etc. These status changes may be saved as data associated with wearable device 14, to facilitate resumed play during another visit to the attraction. Accordingly, upon a subsequent visit, to pre-heat the interaction points 216A-E when pre-existing (e.g., saved) data exists, the pre-existing data is provided in the local cache entries 214. Regardless of whether initial data or pre-existing data is provided, the local cache entries 214 are received at the interaction points 216A-E and interaction point local caches 218 are updated based upon the received local cache entries 214 (block 110). At this point, each of the interaction points 216A-E are pre-heated with data useful for local data processing of subsequent interactions between the interaction points 216A-E with the wearable device. Thus, rapid interaction feedback may be provided.

ii. Localized Interaction Processing and Feedback

The pre-heating of the interaction points may facilitate a more rapid response for localized interaction processing and feedback by the individual interaction points. FIG. 8 is a flow diagram, illustrating a process 130 for facilitating interaction between a local interaction point 216A-E and a wearable device 14, in accordance with an aspect of the present disclosure.

The process 130 begins by determining whether new interactions between a wearable device 14 and an interaction point 216A-E are received (decision block 132). For example, an interaction may include moving the wearable device 14 into close proximity to an interaction point 216A-E. The interaction may include data transmission between the wearable device 14 and the interaction point 216A-E, indicating that a user has interacted with the interaction point 216A-E. As mentioned above, interactions by the wearable device 14 may be facilitated by radio frequencies with a reader of the interaction point 216A-E. The interaction point 216A-E may continue polling for interactions until an interaction is received.

Once an interaction is received (e.g., wearable device 14 information is received at the interaction point 216A-E), the interaction is processed, using the local cache 218 of the interaction point 216A-E and feedback is provided (block 134). For example, because the interaction points 216A-E are pre-heated, the interaction points 216A-E are able to locally process received interactions to determine feedback to provide to an attraction participant. Returning to our key acquisition example, assume that interaction point 216B of FIG. 10 subscribes to key acquisition data. The local processor 222 of the interaction point 216B may be programmed to provide entry to a gate 224 only if the local cache 218 of the interaction point 216B indicates that a proper key and/or proper number of keys are associated with the identifier of the wearable device 14 that is attempting to access the gate 224 via an interaction with the interaction point 216B. If no such association exists, the gate 224 may remain closed and denial feedback, such as flashing red lights and/or haptic feedback may be implemented by the interaction point 216B (e.g., on the wearable device 14). In one embodiment, such feedback may be facilitated by writing a feedback indicator to memory of the wearable device 14, causing a microcontroller of the wearable device 14 to implement lights and/or other feedback associated with the feedback indicator stored written to the wearable device 14 memory.

The key acquisition, virtual coin collection, and/or other game status discussed herein may be represented by data stored in the local cache 218 and/or the user statistics data store 22. Accordingly, any data updates 226 based upon the interaction may be updated in the local cache 218 and provided to the cloud services 210 (block 136). This results in pre-heating the other interaction points 216A-E based upon processing by an interacted upon interaction point 216A-E. For example, returning to the key acquisition and usage example provided above, assume that the processor 220 of the interaction point 216B is programmed to reduce a key count by one when a key is used to open the gate 224. Upon opening the gate 224, the local cache 218 of interaction point 216B may be updated to indicate that one less key has been acquired or is virtually possessed by the participant (e.g., by reducing a key count associated with the identifier of the wearable device 14 associated with the participant).

iii. Data Updates for Subscribing Interaction Points

Additionally, the data updates 226 may be propagated to the cloud services 210 and/or other interaction points 216A-E. For example, in some embodiments interaction point 216B may directly send data updates 226 to interaction points 216A-E (e.g., based upon subscription information that interaction point 216B is aware of). In some embodiments, interaction point 216B may directly provide the data updates 226 to the cloud services 210, enabling the cloud services 210 to propagate the data updates 226 to subscribing interaction points 216A-E. In some embodiments, a hybrid approach may be used, where the interaction point 216B sends the data updates 226 to an intermediary interaction point (e.g., interaction point 216E), enabling the intermediary interaction point (e.g., 216E) to propagate the data updates 226 to other interaction points 216A-E and/or the cloud services 210, enabling further propagation of the data updates 226.

By propagating data updates 226 to subscribing interaction points 216A-E, a more granulized approach to data transmission may be provided, resulting in decreased data transmission resulting in more-efficient bandwidth utilization, decreased network latency, etc. FIG. 9 is a flow diagram, illustrating a process 150 for updating local interaction points within the interactive system 200, based upon a local interaction with a local interaction point, in accordance with an aspect of the present disclosure. The process 150 begins by requesting a subscription for a portion of information from the cloud service 210 (block 152). For example, the subscription request might include a particular subset of data (e.g., key acquisition data, virtual coin collection data) that the interaction point 216A-E wishes to receive updates for. The request could include a subset of the wearable device identifiers to receive updates for (e.g., only data related to wearable device identifiers for wearable devices that are in a nearby zone to the interaction point 216A-E). Returning to the key acquisition example discussed above, assume the initial interaction point has not subscribed to key acquisition data. Therefore, as illustrated in FIG. 10, the data updates 226 relating to the usage of a key to open the gate 224 is not provided to the initial interaction point 216A. As may be appreciated, this may significantly reduce the amount of data that is transmitted between the cloud services 210 and/or the interaction points 216A-E.

The request is received and registered at the cloud services 210 (block 154). For example, the cloud services 210 may maintain a subscription data store that provides an indication of subscribing entities and subscription data. In some embodiments, the cloud services 210 may propagate subscription data to the interaction points 216A-E for direct propagation of update data to subscribing entities from the interaction points 216A-E.

Once subscriber information is received, portions of the available attraction data that correspond to the requested subscription are accumulated (block 156) and provided to the subscribing entity (e.g., the interaction point 216A-E sending the subscription request) (block 158). For example, one interaction point 216A-E may request both key acquisition data as well as virtual coin collection data, while another interaction point 216A-E may request only key acquisition data or only virtual coin collection data, etc. The relevant subscription data is provided to the subscribing entity, where it is received by the subscribing inspection point 216A-E (block 160).

The subscribing inspection point 216A-E may update its local cache 218 with the received data (block 162), enabling the subscribing inspection point 216A-E to facilitate additional interactions between itself and the wearable device 14, using its own local data. As may be appreciated, this may result in significant reduction in network latency, as the subscribing interaction point does not need to access remotely stored data to provide the proper feedback to the attraction participant (e.g., via the wearable device 14).

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to FIGS. 1-10 may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. An interaction point, comprising:
 a hardware-based processor configured to communicate with a distributed data store that maintains an interactive game progress status of a game participant associated with a wearable electronic device while the game participant is participating in a game;
 a local cache data store configured to locally store a local portion of the interactive game progress status, wherein the local portion of the interactive game progress status is used in local interaction processing by the hardware-based processor;
 a radio-frequency identification (RFID) reader, configured to retrieve electromagnetic radiation of the wearable electronic device indicative of an interaction with the interaction point, the interaction comprising data transmission between the RFID reader and the wearable electronic device, the retrieving of the electromagnetic radiation enabled by a proximity between the RFID reader and the wearable electronic device;

wherein the hardware-based processor is configured to, based upon the interaction with the interaction point, perform the local interaction processing using the local portion of the interactive game progress status, by modifying the local portion of the interactive game progress status based upon the interaction; and wherein the hardware-based processor is configured to, based at least in part upon the modifying of the local portion of the interactive game progress status, modify the interactive game progress status stored in the distributed data store.

2. The interaction point of claim 1, comprising:
communications circuitry configured to communicatively couple the interaction point with one or more cloud services, the one or more cloud services comprising at least one computer and at least one data store configured to facilitate persistent storage of the interactive game progress status.

3. The interaction point of claim 2, wherein the interaction point is a first interaction point of a set of interaction points associated with the game;
wherein the hardware-based processor is configured to:
read an identifier (ID) of the wearable electronic device via the RFID reader; and
update the interactive game progress status in the local cache data store based upon the ID.

4. The interaction point of claim 3, wherein the hardware-based processor is configured to:
determine whether the ID is new to the game;
cause registration of the ID with the one or more cloud services when it is determined that the ID is new to the game; and
request an interactive game progress status associated with the ID from the one or more cloud services when it is determined that the ID already exists in the game.

5. The interaction point of claim 4, wherein the registration of the ID with the one or more cloud services comprises causing a set of initial values to be associated with the ID in a data store of the one or more cloud services, wherein the initial values comprise an initial game progress status for the game.

6. The interaction point of claim 5, wherein the hardware-based processor is configured to receive the set of initial values and update the interactive game progress status in the local cache data store based upon the received set of initial values.

7. The interaction point of claim 4, wherein when it is determined that the ID already exists in the game, the hardware-based processor is configured to:
request a saved game progress status stored in a data store of the one or more cloud services that is associated with the ID;
receive the saved game progress status; and
update the interactive game progress status in the local cache data store based upon the saved game progress status.

8. The interaction point of claim 1, wherein the hardware-based processor is configured to cause feedback to be rendered by the wearable electronic device by determining the feedback from multiple feedback options, based at least upon the interaction with the interaction point and the interactive game progress status stored in the local cache data store.

9. The interaction point of claim 8, wherein the feedback comprises an audible output, a tactile output, one or more light illuminations, or any combination thereof.

10. The interaction point of claim 8, wherein the interactive game progress status comprises a score of the game.

11. The interaction point of claim 8, wherein the hardware-based processor is configured to:
determine an eligibility for access to an exclusive area of the game based upon the interactive game progress status;
when eligible, permit access to the exclusive area of the game; and
when not eligible, deny access to the exclusive area of the game.

12. The interaction point of claim 8, wherein the hardware-based processor is configured to cause the feedback to be rendered by the wearable electronic device by writing a feedback indication, interpretable by a microprocessor of the wearable electronic device, to a memory of the wearable electronic device, such that the microprocessor may detect the feedback indication and implement the feedback.

13. The interaction point of claim 1, wherein the hardware-based processor is configured to modify the local portion of the interactive game progress status based at least upon the interaction with the interaction point and the local portion of the interactive game progress status stored in the local cache data store.

14. The interaction point of claim 13, wherein the hardware-based processor is configured to provide modifications to the local portion of the interactive game progress status to one or more other interaction points that have subscribed to the local portion of the interactive game progress status.

15. The interaction point of claim 13, wherein the hardware-based processor is configured to provide modifications to the local portion of the interactive game progress status to one or more cloud services that facilitate persistent storage of the interactive game progress status.

16. An interactivity system for a game, comprising:
a first interaction point, comprising:
a first hardware-based processor configured to communicate with a distributed data store that maintains an interactive game progress status of a game participant associated with a wearable device while the game participant is participating in a game;
a first local cache data store configured to locally store a first local portion of the interactive game progress status, wherein the local portion of the interactive game progress status is used in a first local interaction processing by the first hardware-based processor, the first local interaction processing pertaining to a first portion of the game local to the first interaction point; and
a first radio-frequency identification (RFID) reader, configured to retrieve electromagnetic radiation of a wearable electronic device indicative of an interaction with the first interaction point;
wherein the first hardware-based processor is configured to, based upon the interaction with the first interaction point, modify the first local portion of the interactive game progress status; and
a second interaction point, comprising:
a second hardware-based processor configured to communicate with the distributed data store that maintains the interactive game progress status of the game participant associated with the wearable device, while the game participant is participating in the game;
a second local cache data store configured to store a second local portion of the interactive game progress status pertaining to a second portion of the game local to the second interaction point; and a second RFID reader, configured to retrieve electromagnetic radiation of a wearable electronic device indicative of an interaction with the second interaction point;

wherein the first interaction point is communicatively coupled to the second interaction point in a point-to-point mesh network; and wherein the second hardware-based processor is configured to, based upon the interaction with the second interaction point, modify at least a portion of the second portion of the interactive game progress status at the second interaction point and the first portion of the interactive game progress status stored at the first local cache data store of the first interaction point.

17. The interactivity system of claim 16, wherein:

the first hardware-based processor is configured to provide modifications to the at least a portion of the first portion of the interactive game progress status to the second interaction point, only when the second interaction point has subscribed to the modifications.

18. A tangible, non-transitory, machine-readable medium, comprising machine-readable instructions to:

receive, at an interaction point, interaction data from a wearable electronic device, via data transmission between a radio-frequency identification (RFID) reader of the interaction point and a wearable electronic device, the receiving of the interaction data enabled by a proximity between the RFID reader and a wearable electronic device, wherein the interaction data is indicative of an interaction between the wearable electronic device and the interaction point;

locally store a local portion of interactive game progress status used in local interaction processing in a local cache of the interaction point, the interactive game progress status defining at least an interactive game progress status of a game participant associated with the wearable electronic device, while the game participant is participating in a game;

modify the local portion of the interactive game progress status in the local cache based upon the received interaction data, resulting in a modified local portion of the interactive game progress status; and provide one or more updates to the interactive game progress status to another interaction point, a distributed data store, or both, based upon the modified local portion of the interactive game progress status, to update the interactive game progress status at a location remote from the interaction point.

19. The machine-readable medium of claim 18, comprising instructions to:

identify one or more interaction points that have subscribed to the at least a portion of the locally stored portion of the interactive game progress status; and provide the local portion of the interactive game progress status to the one or more interaction points that have subscribed to the local portion of the interactive game progress status.

20. The machine-readable medium of claim 18, wherein the interactive game progress status comprises:

a virtual key acquisition status, a virtual coin collection status, or both.

\* \* \* \* \*